United States Patent
Wang et al.

(10) Patent No.: US 11,231,914 B1
(45) Date of Patent: Jan. 25, 2022

(54) COMMUNITY DETECTION USING FAST LOW-CARDINALITY SEMIDEFINITE PROGRAMMING

(71) Applicant: Robert Bosch GmbH, Stuttgart (DE)

(72) Inventors: Po-Wei Wang, Pittsburgh, PA (US); Jeremy Kolter, Pittsburgh, PA (US); Filipe J. Cabrita Condessa, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/028,251

(22) Filed: Sep. 22, 2020

(51) Int. Cl.
*G06F 8/35* (2018.01)
*G06F 17/18* (2006.01)

(52) U.S. Cl.
CPC ............. *G06F 8/35* (2013.01); *G06F 17/18* (2013.01)

(58) Field of Classification Search
CPC ....................................................... G06F 8/35
See application file for complete search history.

(56) References Cited

U.S. PATENT DOCUMENTS

| | | | | |
|---|---|---|---|---|
| 2014/0292765 | A1* | 10/2014 | Maruyama | G06T 11/206 345/440 |
| 2017/0323028 | A1* | 11/2017 | Jonker | G06F 16/9024 |
| 2020/0082112 | A1* | 3/2020 | Altshuler | G06F 21/6227 |

OTHER PUBLICATIONS

Agarwal et al., Modularity-Maximizing Graph Communities Via Mathematical Programming, The European Physical Journal B, vol. 66, No. 3, pp. 409-418 (2008).
Backstrom et al., Group Formation in Large Social Networks: Membership, Growth, and Evolution, KDD '06: Proceedings of the 12th ACM SIGKDD International Conference on Knowledge Discovery and Data Mining , pp. 44-54. New York, NY, USA, ACM Press, (2006).
Bae et al., Scalable and Efficient Flow-Based Community Detection for Large-Scale Graph Analysis, Association for Computing Machinery (ACM) Transactions on Knowledge Discovery from Data (TKDD), vol. 11, No. 3 (2017).
Barvinok, A Remark on the Rank of Positive Semidefinite Matrices Subject to Affine Constraints, Discrete & Computational Geometry, vol. 25, No. 1 (2001).
Barvinok, Problems of Distance Geometry and Convex Properties of Quadratic Maps, Discrete & Computational Geometry, vol. 13, No. 2 (1995).

(Continued)

*Primary Examiner* — Jae U Jeon
(74) *Attorney, Agent, or Firm* — Brooks Kushman P.C.

(57) ABSTRACT

Community detection for a network using low-cardinality semidefinite programming is described. Data descriptive of a set of nodes of a network is received. The data includes a set of nodes representing entities of a system and edges representing connections between the entities of the system. A modularity maximization is performed to assign each node of the set of nodes to one or more communities to generate multiple-cardinality embeddings. The multiple-cardinality embeddings are rounded to unit cardinality to recover a community assignment with maximum modularity. The community assignment is refined and aggregated to create an aggregate network defining a set of connected communities of the network. The network is operated on in accordance with the community assignment.

20 Claims, 4 Drawing Sheets

(56) References Cited

OTHER PUBLICATIONS

Beskow et al., Bot Conversations are Different: Leveraging Network Metrics for Bot Detection in Twitter, IEEE/ACM International Conference on Advances in Social Networks Analysis and Mining (ASONAM) (2018).
Blondel et al., Fast Unfolding of Communities in Large Networks, Journal of Statistical Mechanics: Theory and Experiment (2008).
Bomze et al., Quadratic Factorization Heuristics for Copositive Programming, Mathematical Programming Computation, vol. 3 (2011).
Bomze et al., The Structure of Completely Positive Matrices According to Their CP-Rank and CP-Plus-Rank, Linear Algebra and Its Applications, vol. 482 (2015).
Boumal, A Riemannian Low-Rank Method for Optimization Over Semidefinite Matrices With Block-Diagonal Constraints, arXiv preprint arXiv:1506.00575 (2015).
Boumal et al., Manopt, a Matlab Toolbox for Optimization on Manifolds, Journal of Machine Learning Research, vol. 15, No. 1 (2014).
Bozdag et al., Breaking the Filter Bubble: Democracy and Design, Ethics and Information Technology, vol. 17, No. 4 (2015).
Brandes et al., On Modularity Clustering, IEEE Transactions on Knowledge and Data Engineering, vol. 20, No. 2 (2007).
Burer, A Gentle, Geometric Introduction to Copositive Optimization, Mathematical Programming, vol. 151, No. 1 (2015).
Burer et al., Local Minima and Convergence in Low-Rank Semidefinite Programming, Mathematical Programming, vol. 103, No. 3 (2005).
Du et al., Community Detection in Large-Scale Social Networks, in Proceedings of the 9th WebKDD and 1st SNA-KDC 2007 Workshop on Web Mining and Social Network Analysis (2007).
Dur, Copositive Programming—a Survey, in Recent Advances in Optimization and Its Applications in Engineering (2010).
Frieze et al., Improved Approximation Algorithms for Max K-Cut and Max Bisection, in International Conference on Integer Programming and Combinatorial Optimization, pp. 1-13 (1995).
Girvan et al., Community Structure in Social and Biological Networks, Proceedings of the National Academy of Sciences, vol. 99, No. 12 (2002).
Goemans et al., Improved Approximation Algorithms for Maximum Cut and Satisfiability Problems Using Semidefinite Programming, Journal of the Association for Computing Machinery (JACM), vol. 42, No. 6 (1995).
Gray et al., Nonnegative Factorization of Positive Semidefinite Nonnegative Matrices, Linear Algebra and Its Applications, vol. 31 (1980).
Groetzner et al., A Factorization Method for Completely Positive Matrices, Linear Algebra and Its Applications, vol. 591, No. 1 (2020).
Javanmard et al., Phase Transitions in Semidefinite Relaxations, Proceedings of the National Academy of Sciences, vol. 113, No. 16 (2016).
Kernighan et al., An Efficient Heuristic Procedure for Partitioning Graphs, The Bell System Technical Journal, vol. 49, No. 2 (1970).
Lasserre, Global Optimization with Polynomials and the Problem of Moments, SIAM Journal on Optimization, vol. 11, No. 3 (2001).
Leskovec et al., Community Structure in Large Networks: Natural Cluster Sizes and the Absence of Large Well-Define Clusters, Internet Mathematics, vol. 6, No. 1 (2009).
Maxfield et al., On the Matrix Equation X'X=A, Proceedings of the Edinburgh Mathematical Society, vol. 13, No. 2 (1962).
Newman, Finding Community Structure in Networks Using the Eigenvectors of Matrices, Physical Review E, vol. 74, No. 3 (2006).
Newman et al., Finding and Evaluating Community Structure in Networks, Physical Review E, vol. 69, No. 2 (2004).
O'Donoghue et al., Conic Optimization Via Operator Splitting and Homogeneous Self-Dual Embedding, Journal of Optimization Theory and Applications, vol. 169, No. 3 (2016).
Ozaki et al., A Simple Acceleration Method for the Louvain Algorithm, International Journal of Computer and Electrical Engineering, vol. 8, No. 3 (2016).
Parrilo, Semidefinite Programming Relaxations for Semi-algebraic Problems, Mathematical Programming, vol. 96, No. 2 (2003).
Pataki, On the Rank of Extreme Matrices in Semidefinite Programs and the Multiplicity of Optimal Eigenvalues, Mathematics of Operations Research, vol. 23, No. 2) (1998).
Reichardt et al., Statistical Mechanics of Community Detection, Physical Review E, vol. 74, No. 1 (2006).
Sturm, Using SeDuMi 1.02, a Matlab Toolbox for Optimization Over Symmetric Cones, Optimization Methods and Software, vol. 11, Nos. 1-4 (1999).
Swamy, Correlation Clustering: Maximizing Agreements Via Semidefinite Programming, in Proceedings of the 15th Annual ACM-SIAM Symposium on Discrete Algorithms, pp. 526-527, Society for Industrial and Applied Mathematics (2004).
Traag et al., From Louvain to Leiden: Guaranteeing Well-Connected Communities, Scientific Reports, vol. 9, No. 1 (2019).
Wang et al., Semi-Supervised Learning Using Greedy Max-Cut, Journal of Machine Learning Research, vol. 14 (2013).
Wang et al., The Mixing Method: Low-Rank Coordinate Descent for Semidefinite Programming with Diagonal Constraints, arXiv preprint arXiv: 1706.00476 (2017).
Watts et al., Collective Dynamics of 'Small-World' Networks, Nature, vol. 393 (1998).
Yang et al., Defining and Evaluating Network Communities Based on Ground-Truth, Knowledge and Information Systems, vol. 42, No. 1 (2015).
Yang et al., A Comparative Analysis of Community Detection Algorithms on Artificial Networks, Scientific Reports, vol. 6, No. 30750 (2016).
Zachary, An Information Flow Model for Conflict and Fission in Small Groups, Journal of Anthropological Research, vol. 33, No. 4 (1977).

* cited by examiner

Algorithm 1 The Leiden-Locale method

1: procedure LEIDEN-LOCALE(Graph $G$, Partition $P$)
2:     do
3:         $E \leftarrow \text{LocaleEmbeddings}(G, P)$
4:         $P \leftarrow \text{LocaleRounding}(G, P, E)$
5:         $G, P, \text{done} \leftarrow \text{LeidenRefineAggregate}(G, P)$
6:     while
7:     return $P$
8: end procedure

COMMUNITY DETECTION USING FAST LOW-CARDINALITY SEMIDEFINITE PROGRAMMING

TECHNICAL FIELD

The present disclosure relates to community detection using fast low-cardinality semidefinite programming, as well as to its use in improving the functioning of network-related systems that involve community detection.

BACKGROUND

A network may be defined as a set of nodes and edges, where nodes represent entities and edges represent connection between entities. Connections can be unidirectional or bidirectional. Networks can be applied to model dependencies or interactions in large scale systems (e.g., physical, chemical, mechanical, economic, social, epidemiological, biological, neuronal, computational, etc.). A community refers to a set of nodes of the network. A partition refers to a set of communities of the network. Community detection refers to finding clusters of densely connected nodes in a network. Identifying communities in a network may provide insight into the underlying structure and organization of the system being modeled. This insight may then be used to better monitor, model, sense, or actuate on the system of interest.

SUMMARY

Aspects of the disclosure relates to systems and methods for community detection. As described in detail herein, a Locale (LOw-CArdinaLity Embedding) algorithm generalizes modularity maximization for community detection through a low-cardinality embedding process such that nodes can belong to multiple communities. In addition, a Locale-Leiden algorithm is introduced that extends the Leiden community detection algorithm to use the Locale algorithm for maximization of modularity. Use of the Locale algorithm further allows for processing to solve heavily constrained semi-definite programming (SDP) situations, when the solution is sparse but not low-rank, due to improve scaling abilities, as well as for providing more efficient SDP programming approaches with low-cardinality embeddings.

According to an illustrative example, a method for improved performance of community detection for a network is described. Data descriptive of a set of nodes of a network is received. The data includes a set of nodes represent entities of a system and edges representing connections between the entities of the system. A modularity maximization is performed to assign each node of the set of nodes to one or more communities to generate multiple-cardinality embeddings. The multiple-cardinality embeddings are rounded to unit cardinality to recover a community assignment with maximum modularity. The community assignment is refined and aggregated to create an aggregate network defining a set of connected communities of the network. The network is operated on in accordance with the community assignment.

According to another illustrative example, a system for performing community detection is described. One or more computing devices are programmed to receive data descriptive of a set of nodes of a network, the data including a set of nodes representing entities of a system and edges representing connections between the entities of the system; perform a modularity maximization to assign each node of the set of nodes to one or more communities to generate multiple-cardinality embeddings; round the multiple-cardinality embeddings to unit cardinality to recover a community assignment with maximum modularity; refine and aggregate the community assignment to create an aggregate network defining a set of connected communities of the network; and operate on the network in accordance with the community assignment.

According to yet another illustrative example, a non-transitory computer-readable medium includes instructions for performing community detection, that, when executed by one or more computing devices, cause the one or more computing devices to perform operations including to receive data descriptive of a set of nodes of a network, the data including a set of nodes representing entities of a system and edges representing connections between the entities of the system; perform a modularity maximization to assign each node of the set of nodes to one or more communities to generate multiple-cardinality embeddings; round the multiple-cardinality embeddings to unit cardinality to recover a community assignment with maximum modularity; refine and aggregate the community assignment to create an aggregate network defining a set of connected communities of the network; and operate on the network in accordance with the community assignment, wherein the data descriptive of the set of nodes of the network describes of one or more of a physical, chemical, mechanical, economic, social, epidemiological, biological, neuronal, or computational system, and the set of connected communities indicate a community structure of the underlying system.

BRIEF DESCRIPTION OF THE DRAWINGS

FIG. 2 illustrates an example of pseudo code for performing the Locale method, in accordance with an embodiment of the disclosure;

DETAILED DESCRIPTION

Figure 1:
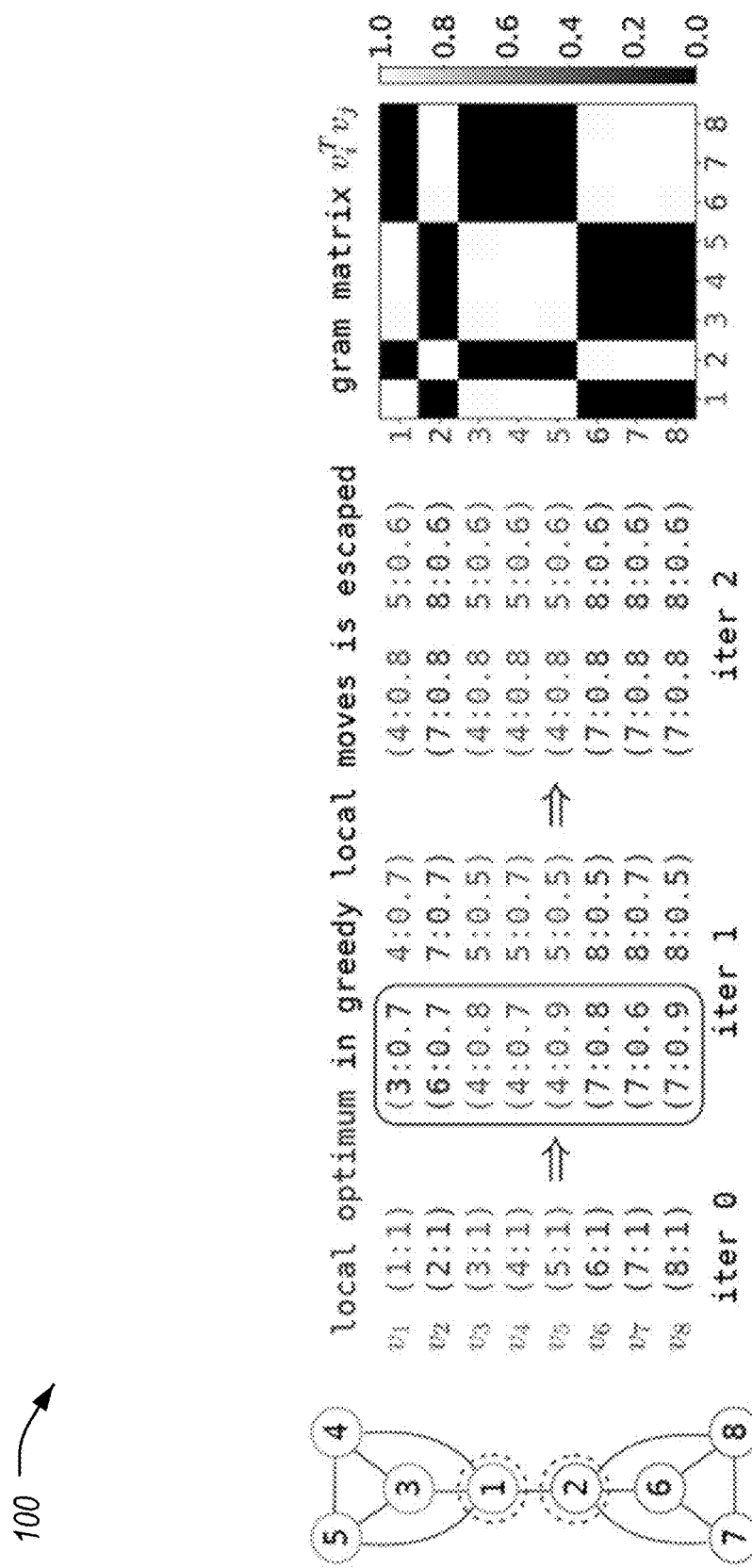
FIG. 1 illustrates an example execution of the Locale method illustrating an escape of a local optimum using a greedy local move procedure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Modularity maximization has been an important tool for understanding a community structure of a network. Yet, the underlying optimization problem is nonconvex and NP-hard to solve. Approaches such as the Louvain or Leiden methods focus on different heuristics to help escape local optima, but such methods still depend on a greedy step that moves node assignment locally and is prone to getting trapped. In this disclosure, a new class of low-cardinality algorithms are disclosed that generalize the local update to maximize a semidefinite relaxation derived from max-k-cut. This approach is scalable, empirically achieving the global semidefinite optimality for small cases, while outperforming in real-world datasets with little additional time cost. From an algorithmic perspective, it also opens a new avenue for scaling-up semidefinite programming (SDP) when the solutions are sparse instead of low-rank.

In this disclosure, a Locale (LOw-CArdinaLity Embedding) approach is provided, which improves the performance of community detection. The Locale approach generalizes the greedy local move procedure of the Louvain and Leiden methods by optimizing a semidefinite relaxation of modularity, which originates from the extremal case of the max-k-cut semidefinite approximation when k goes to infinity. A scalable solver for this semidefinite relaxation is provided by exploiting the low-cardinality property in the solution space. Traditionally, SDP is considered unscalable. Recent advances in Riemannian manifold optimization provide a chance to scale-up by optimizing directly in a low-rank solution space; however, such advances are not amenable in many relaxations such as max-k-cut SDP, where there are nonnegativity constraints on all entries of the semidefinite variable X. Due to the nonnegativity constraints, the solution X is sparse and a low-cardinality solution in the factorized space V may suffice. These observations lead to a first contribution, which is a scalable solver for low-cardinality semidefinite programming subject to nonnegative constraints. A second contribution is using this solver to create a generalization of existing community detection methods, which outperforms other methods because it is less prone to local optima.

With respect to notation used herein, upper-case letters are used to indicate matrices, while lower-case letters are used to represent vectors and scalars. For a matrix X, the symmetric semidefinite constraint is denoted as $X \succcurlyeq 0$, and the entry-wise nonnegative constraint is denoted as $X \geq 0$. For a vector v, card(v) is used to represent the number of nonzero entries, $\|v\|$ for the 2-norm, and $\text{top}_k^+(v)$ for the sparsified vector of the same shape containing the largest k nonnegative coordinates of v. For example, $\text{top}_2^+((-1, 3))=(0, 3)$, and $\text{top}_1^+((-1, -2))=(0, 0)$. For a function Q(V), the terminology $Q(v_i)$ is used for the same function taking the column vector $v_i$ while pinning all other variables. The term [r] is used to represent the set $\{1, \ldots, r\}$, and e(t) for the basis vector of coordinate t.

Definitionally, modularity is a measure of a structure of a network or graph. Modularity may be used to measure the strength of division of a network into communities. Networks with high modularity have relatively dense connections between the nodes within modules but sparse connections between nodes in different modules. With respect to modularity maximization, modularity may be used as a measure of the quality of densely connected clusters. More specifically, modularity is the fraction of the edges that fall within the given groups minus the expected fraction if edges were distributed at random. Modularity Q, then, may be defined as the fraction of edges that fall within one group or another, minus the expected number of edges within the respective groups for a random graph with the same node degree distribution as the given network. The Modularity Q of a community assignment c, may be computed as follows:

$$Q(c) = \frac{1}{2m} \Sigma_{i,j} \left[ a_{i,j} - \frac{d_i d_j}{2m} \right] \delta(c_i = c_j), \quad (1)$$

where:

$a_{i,j}$ is the weight of the edge connecting nodes i and j;

$d_i = \Sigma_j a_{i,j}$ is the degree of the ith node;

$$m = \Sigma_{i,j} \frac{a_{i,j}}{2}$$

is the sum of edge weights;

$c_i \in [r]$ encode the community membership of the node i among the r possible communities; and $\delta(c_i = c_j)$ is a Kronecker delta, which is 1 if nodes i and j belong to the same community (i.e., if $c_i = c_j$) and zero otherwise.

In general, the higher the modularity, the better the community assignment. However, optimizing modularity is NP-hard, so focus may be placed on various heuristics, such as spectral methods, simulated annealing, linear programming, and SDP. A popular heuristic, the Louvain method, initializes each node with a unique community and updates the modularity Q(c) cyclically by moving $c_i$ to the best neighboring communities. When no local improvement can be made, the Louvain method aggregates nodes with the same community and repeats itself until no new communities are created. Experiments show that it is fast and performant and can be further accelerated by choosing update orders wisely. However, the local steps can easily get stuck at local optima, and it may even create disconnected communities containing disconnected components. As a follow-up work, the Leiden method fixes the issue of disconnected communities by adding a refinement step that splits disconnected communities before aggregation. However, this enhanced Leiden method still depends on greedy local steps and still suffers from local optima.

SDP has been a powerful tool in approximating NP-complete problems. Specifically, the max-k-cut SDP deeply relates to community detection, where max-k-cut maximizes the sum of edge weights between partitions, while community detection maximizes the sum inside partitions. The max-k-cut SDP is given by the optimization problem:

$$\text{maximize } X - \sum_{ij} a_{ij} x_{ij}, \text{ such that:} \quad (2)$$

$$X \succcurlyeq 0, X \geq \frac{1}{k-1}, \text{diag}(X) = 1$$

When limiting the rank of X to be k−1, values of $x_{ij}$ become discrete and are either 1 or −1/(k−1), which works similarly to a Kronecker delta $\delta(c_i = c_j)$. If k goes to infinity, the constraint set reduces to $\{X \geq 0, X \succcurlyeq 0, X_{ii}=1\}$, and a 0.75 approximation ratio to correlation clustering on the relaxation is applied (as the bound does not apply to modularity maximization). However, these SDP relaxations are less practical because semidefinite solvers may not scale with the numerous constraints, and the runtime of the rounding procedure converting the continuous variables to discrete assignments grows with $O(n^2k)$. By considering max-2-cut iteratively at every hierarchical level, some approaches are able to perform well on small datasets by combining SDPs with the greedy local move. Yet, such approaches are still unscalable due to the SDP solver. It may also be possible to apply SDPs to solve clustering problems, but such approaches may not be able to optimize modularity.

Regarding low-rank methods for SDP, an approach to scale-up semidefinite programming is to exploit its low-rank structure when possible. When there are m constraints in an SDP, it can be shown that there must be an optimal solution with rank less than $\sqrt{2m}$, and the bound for this may be tight. Thus, when the number of constraints m is subquadratic, the semidefinite solution X can be factorized as $V^TV$, where the matrix V requires only $n\sqrt{2m}$ memory instead of the original $n^2$ of X. Many SDPs, including the max-k-cut SDP approximation discussed herein, have entry-wise constraints on X such as $X \geq 0$; thus, the low-rank methods may not be amenable to such problems.

The constraint $DNN = \{X | X \succeq 0, X \geq 0\}$ in a SDP relaxation is connected to an area referred to as copositive programming, which focuses on the sets:

$$CP = \{X | v^T X v \geq 0, \forall v \geq 0\} \text{ and } CP^* = \{V^T V | V \geq 0, V \in \mathbb{R}^{n \times r}, \forall v \in \mathbb{N}\} \quad (3)$$

Significantly, both CP and CP* are convex, but the set membership query is NP-hard. The copositive sets relate to semidefinite cone $S = \{X | V^T X v \geq 0, \forall v\}$ by the hierarchy:

$$CP \supseteq S \supseteq DNN \supseteq CP^* \quad (4)$$

For low dimensions $n \leq 4$, the set $DNN = CP^*$, but $DNN \supsetneq CP^*$, for $n \geq 5$. Optimization over the copositive set is hard in the worst case because it contains the class of binary quadratic programming. Approximation through optimizing the V space has been proposed, but it is still time-consuming because it requires a large copositive rank $k = O(n^2)$.

The Locale algorithm and its application to community detection is now discussed in further detail. The Locale algorithm for community detection generalizes the greedy local move procedure from the Louvain and Leiden methods. As discussed in detail, the disclosure describes that the low-cardinality embedding may be derived from the local move procedure, its connection to the semidefinite relaxation, and then how to round the embedding back to the discrete community assignments. The disclosure further explains how to incorporate this algorithm into full community detection methods.

First, the local move procedure may be generalized by low-cardinality embeddings. Community detection algorithms such as the Louvain and Leiden methods depend on a core component, the local move procedure, which locally optimizes the community assignment for a node. The local move procedure first initializes each node with a unique community, then updates the community assignment node by node and changes $c_i$ to a neighboring community (or an empty community) that maximizes the increment of $Q(c_i)$. That is, the local move procedure is an exact coordinate ascent method on the discrete community assignment c. Because the local move procedure operates on the discrete space, it is prone to local optima. To improve the local move procedure, a generalized maximum modularity problem may be introduced such that each node may belong to more than one community.

Regarding the generalized maximum modularity problem, to assign a node to more than one community, the Kronecker delta $\delta(c_i = c_j)$ may be rewritten in Q(c) as a dot product between basis vectors.

Let e(t) be the basis vector for community t with one in $e(t)_t$ and zeros otherwise. By creating an assignment vector $v_i = e(c_i)$ for each node i, it can be seen that $\delta(c_i = c_j) = v_i^T v_j$, and one can reparametrize the modularity function Q(c) defined in (1) as:

$$Q(V) := \frac{1}{2m} \sum_{ij} \left[ a_{ij} - \frac{d_i d_j}{2m} \right] v_i^T v_j \quad (5)$$

Notice that the original constraint $c_i \in [r]$ becomes $v_i \in \{e(t) | t \in [r]\}$, and the set becomes equivalent to the below unit norm and unit cardinality constraint in the nonnegative orthant.

$$\{e(t) | t \in [r]\} = \{v_i | v_i \in \mathcal{R}_+^r, \|v_i\| = 1, \text{card}(v_i) \leq 1\} \quad (6)$$

The constraint can be interpreted as the intersection between the curved probability simplex ($v_i \in \mathbb{R}_+^r$, $\|v_i\|=1$) and the cardinality constraint (card $(v_i) \leq 1$), where the latter constraint controls how many communities may be assigned to a node. Naturally, the maximum modularity problem can be generalized by relaxing the cardinality constraint from 1 to k. The generalized problem is given by:

$$\text{maximize}_V \ Q(V) := \frac{1}{2m} \sum_{ij} \left[ a_{ij} - \frac{d_i d_j}{2m} \right] v_i^T v_j, \text{ such that} \quad (7)$$

$$v_i \in \mathbb{R}_+^r, \|v_i\| = 1, \text{card}(v_i) \leq k, \forall i$$

The larger the k, the smoother the problem (7). When k=r the cardinality constraint becomes trivial and the feasible space of V become smooth. The original local move procedure is simply an exact coordinate ascent method when k=1, which can be generalized to work on arbitrary k in a smoother feasible space of V. The resulting V may be referred to as low cardinality embeddings and the generalized algorithm may be referred to as the Locale algorithm.

With respect to the Locale algorithm for low-cardinality embeddings, it may be proved that, as in the local move procedure, there is a closed-form optimal solution for $Q(v_i)$ when focusing on variable $v_i$.

Referring more specifically to the Locale algorithm for low-cardinality embeddings, it can be shown that as with the local move procedure, there is a closed-form optimal solution for Q(vi) when focusing on variable $v_i$.

Proposition 1. The subproblem for variable $v_i$:

$$\text{maximize } v_i Q(v_i), s.t. v_i \in \mathcal{R}_+^r, \|v_i\|=1, \text{card}(v_i) \leq k \quad (8)$$

admits the following optimal solution:

$$v_i = g / \|g\|, \quad (9)$$

$$\text{where } g = \begin{cases} e(t) \text{ with the max } (\nabla Q(v_i))_t & \text{if } \nabla Q(v_i) \leq 0 \\ \text{top}_k^+(\nabla Q(v_i)) & \text{otherwise} \end{cases},$$

where $\text{top}_k^+(q)$ is the sparsified vector containing the top-k-largest nonnegative coordinates of q. For the special case $\nabla Q(v_i) \leq 0$, the t can be chosen with maximum $v_t$ from previous iteration if there are multiple t with maximum $(\nabla Q(v_i))_t$.

With the close-form solution for every subproblem, the local move procedure can now be generalized to a low-cardinality move procedure that works on arbitrary k. Every vector $v_i$ may first be initialized with a unique vector e(i), then the exact block coordinate ascent method may be performed using the optimal update, as shown in equation (9), cycling through all variables $v_i$, i=1, . . . , n, until convergence. The coordinate could also be chosen randomly, and because the updates are exact, we have the following guarantee.

Theorem 2. Applying the low-cardinality update iteratively on random coordinates, the projected gradient of the iterates converges to zero at a O(1/T) rate, where T is the number of iterations.

When implementing the Locale algorithm, the matrix V may be stored in a sparse format since it has a fixed cardinality upper bound and perform all the summation using sparse vector operations. A vector $z=\Sigma_j d_j v_j$ may be maintained, and $\nabla Q(v_i)$ may be computed by $$(\Sigma_j a_{ij} v_j) - \frac{d_i}{2m}(z - d_i v_i).$$

This way, updating all $v_i$ once takes O(card(A)·k log k) time, where the log k term comes from the partial sort to implement the $top_k^+(\cdot)$ operator. Taking a small k (k=8 can be picked in practice), it can be seen that the approach scales to large networks without too much additional time cost to the greedy local move procedure. Implementation-wise, the updating order may be chosen by the smart local move. The r may be initialized to be the number of nodes and increased when $\nabla Q(v_i) \leq 0$ and there is no free coordinate. This corresponds to the assignment to a new empty community in the Louvain method (which also increases the r). At a worst case, the maximum r is n·k, but it may not be observed where in practice r is always less than 2n.

For illustration, an example from the Leiden method in FIG. 1 is shown that, because of the relaxed cardinality constraint, the Locale algorithm is less likely to get stuck at local optima compared to the greedy local move procedure. Instead, FIG. 1 illustrates an example that the Locale escapes the local optimum in greedy local move procedure. As shown, numbers in the parentheses are the low-cardinality embeddings in an indice value format. The above bottleneck graph was used in Leiden to illustration local optima, where a greedy local move procedure following the order of the nodes gets stuck at the local optima in the round-cornered box, splitting node 1 and 2 from the correct communities because of its unit cardinality constraint. In contrast, the Locale (low-cardinality embeddings) algorithm escapes the local optima because it has an additional channel for the top-k communities to cross the bottleneck. The gram matrix of the resulting embeddings shows that it perfectly identifies the communities.

With respect to connections to correlation clustering SDP and copositive programming, the Locale solution may connect to an SDP relaxation of the generalized modularity maximization problem shown at (7). Let r to be large enough and let K=r to drop the cardinality constraint, the resulting feasible gram matrix of V becomes (the dual of) the copositive constraint:

$$\{V^T V | V \geq 0, \text{diag}(V^T V) = 1\} \quad (10)$$

which can be further relaxed to the semidefinite constraint:

$$\{X | X \succeq 0, X \geq 0, \text{diag}(X) = 1\} \quad (11)$$

This semidefinite constraint has been proposed as a relaxation for correlation clustering. With these relaxations, the complete SDP relaxation for the (generalized) maximum modularity problem is:

$$\underset{X}{\text{maximize}} \sum_{ij} \left[ a_{ij} - \frac{d_i d_j}{2m} \right] x_{ij}, \text{ s.t. } X \succeq 0, X \geq 0, \text{diag}(X) = 1 \quad (12)$$

The SDP relaxation may be used to certify whether the Locale algorithm reaches the global optima, given enough cardinality k. That is, if the objective value given by the Locale algorithm meets the SDP relaxation (solvable via an SDP solver), it certifies the globally optimality of (7). In experiments for small datasets that are solvable via SDP solvers, a very low cardinality k=8 is enough to approximate the optimal solution to a difference of $10^{-4}$, and running the Locale algorithm with k=n recovers the global optimum. In addition, the described algorithm is orders-of-magnitude faster than other SDP solvers.

Rounding by changing the cardinality constraint may then be applied. After obtaining the embeddings for the generalized modularity maximization algorithm (7), the embedding is to be converted back to unit cardinality to recover the community assignment for the original maximum modularity problem. This is achieved by running the Locale algorithm with the k=1 constraint, starting at the previous solution. Also, since the rounding procedure reduces all embeddings to unit cardinality after the first sweep, this is equivalent to running the local move procedure of the Louvain method, but initialized with multiple-cardinality embeddings. Likewise, the cardinality constraint can also be increased to update a unit cardinality solution to a higher cardinality solution. These upgrade and downgrade steps can be performed iteratively to increase the quality of the solution slowly, but it is more efficient to only do the downgrade steps in the overall multi-level algorithm. The rounding process has the same complexity to the Locale algorithm since it is a special case of the algorithm with k=1.

Using the information discussed in detail above, the Leiden-Locale algorithm for community detection may be more specifically described. The Leiden method may be used as a framework, with the local move procedure replaced with the Locale algorithm followed by the rounding procedure. While the results are better with more inner iterations of the Locale algorithm, two inner iterations followed by the rounding procedure have been shown to be more efficient in the overall multi-level algorithm over multiple iterations, while substantially improving over past works. The pseudo code is shown in FIG. 2. While only mentioned generally in FIG. 2, after the Locale algorithm is performed additional processing consistent with Leiden may be performed. This includes, for example refinement of the partition and aggregation of the network based on the refined partition, using the non-refined partition to create an initial partition for the aggregate network.

Figure 3:
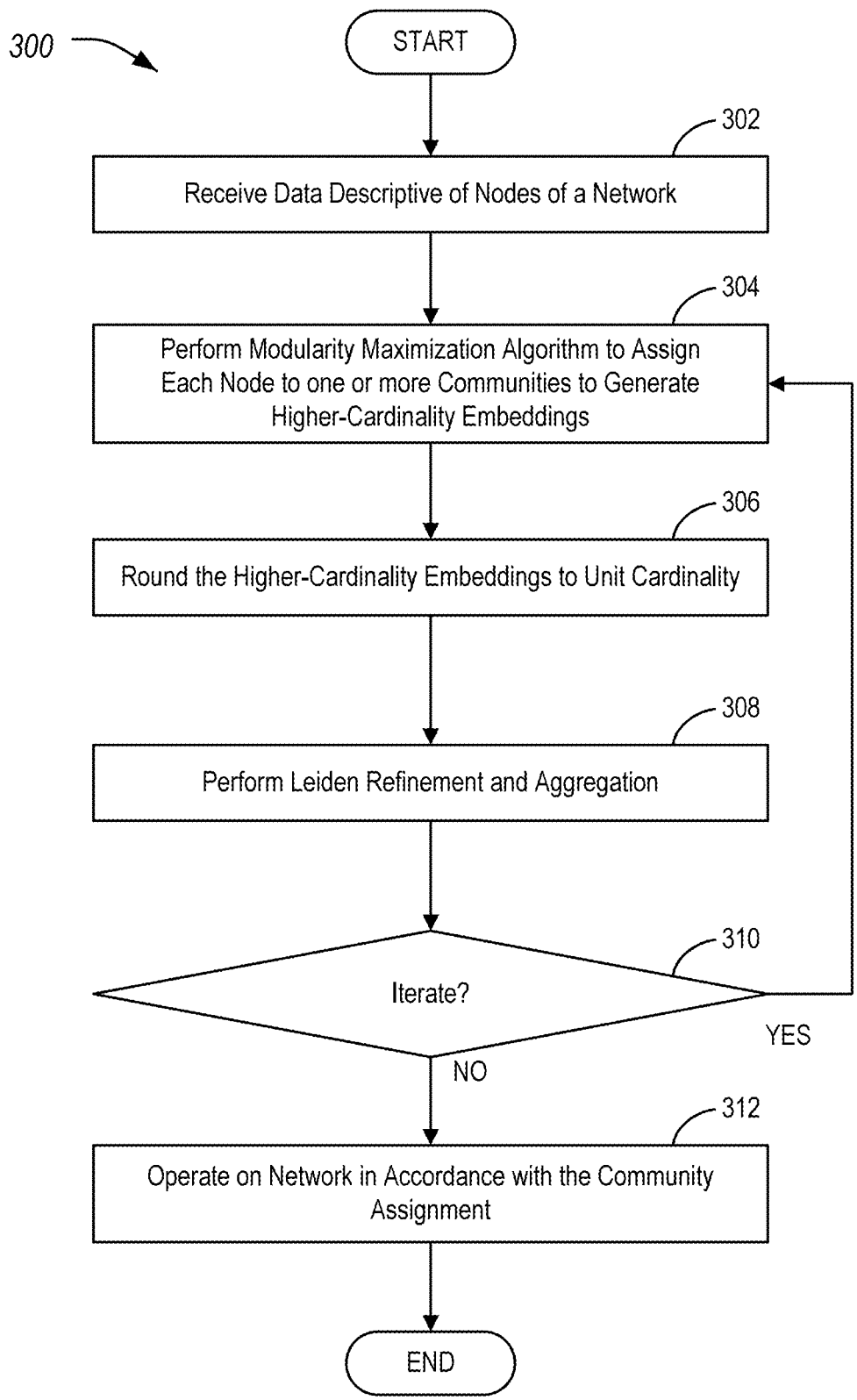
FIG. 3 illustrates an example process for performing the Locale method, in accordance with an embodiment of the disclosure.

FIG. 3 illustrates an example process 300 for performing the Locale method, in accordance with an embodiment of the invention. As shown, at operation 302 data descriptive of a set of nodes of a network is received. The nodes of the network are connected by edges, where nodes represent entities and edges represent connections between the entities. The network may represent various types of system such as a physical, chemical, mechanical, economic, social, epidemiological, biological, neuronal, and/or computational system.

At operation 304, a modularity maximization algorithm is performed to assign each node of the set of nodes to one or more communities to generate multiple-cardinality embeddings. As discussed above, the Locale algorithm extends the modularity determining by rewriting the modularity as a function of basis vectors v that encode membership of a node to a community, $$Q(v) = \frac{1}{2m} \Sigma_{i,j} \left[ a_{i,j} - \frac{d_i d_j}{2m} \right] v_i^T v_j$$

where the membership Kronecker delta is rewritten as a dot product between basis vectors. With $c_i \in [r]$ the community assignment for node i from r possible communities, this formulation is extended to use basis vectors $v_i \in \{e(t)|t \in [r]\}$ where e(t) is a versor. This set becomes thus $\{e(t)|t \in [r]\} = \{v_i | v_i \in \mathcal{R}_+^r, \|v_i\|=1, \text{card}(v_i) \leq k\}$, where a node can belong to at most k communities.

The problem of maximization of the modularity becomes thus:

$$\operatorname*{argmax}_{V} Q(V) = \frac{1}{2m} \sum_{i,j} \left[ a_{i,j} - \frac{d_i d_j}{2m} \right] v_i^T v_j,$$

$$\text{subject to } v_i \in R_+^r, \|v_i\| = 1, \text{card}(v_i) \leq k$$

The solution to the above equation corresponds to the low cardinality embedding. If k=1, this step corresponds to a traditional modularity problem if solved with exact coordinate ascent, if k=r, the feasibility set of V becomes smooth. The solution for $v_i$ can be computed closed form if the focus is on solving for the ith node only (with all the other community assignments for the other nodes fixed) as follows:

$$v_i = \frac{g}{\|g\|},$$

where:

g is computed depending on the value of $\nabla Q(v_i)$.

If this value is positive, then $g = \text{top}_k^+(\nabla Q(v_i))$ corresponds to selecting the top k positive values. If this value is negative, then g=e(t) where t has $\max(\nabla Q(v_i))_t$.

When implementing the Locale algorithm, the matrix V may be stored in sparse format since it has a fixed cardinality upper bound, and the summation operations are done using sparse vector operations. For improved complexity of the algorithm, a vector $z = \Sigma_j d_j v_j$ is maintained and $\nabla Q(v_i)$ is computed as $$(\Sigma_j a_{ij} v_j) - \frac{d_i}{2m}(z - d_i v_i).$$

The updating order is chosen by the smart local move. The initialization of r is a set as the number of nodes (number of initial communities matches the number of nodes) and increase it when $\nabla Q(v_i) \leq 0$ and there is no free coordinate, corresponding to the assignment of a new empty community.

At operation 306, the multiple-cardinality embeddings are rounded to unit cardinality to recover the community assignment for the original maximum modularity problem. This is achieved by running the Locale algorithm with the k=1 constraint, starting at the previous solution. Also, since the rounding procedure reduces all embeddings to unit cardinality after the first sweep, this is equivalent to running the local move procedure of the Louvain method, but initialized with multiple-cardinality embeddings. Likewise, the cardinality constraint could also be increased to update a unit cardinality solution to a higher cardinality solution. These upgrade and downgrade steps can be performed iteratively to increase the quality of the solution slowly, but it may be more efficient to only do the downgrade steps in the overall multi-level algorithm. The rounding process has the same complexity to the Locale algorithm since it is a special case of the algorithm with k=1.

At operation 308, the refinement and aggregation operations of Leiden are performed. As done in Leiden, to perform the refinement, communities in the partition may be split into multiple subcommunities in a refined partition. The refined partition may be obtained as follows. Initially, the refined partition is set to a singleton partition, in which each node is in its own community. The algorithm then locally merges nodes in the refined partition: nodes that are on their own in a community in the refined partition can be merged with a different community. The community with which a node is merged may be selected randomly, so larger communities may be more likely to be selected. Randomness in the selection of a community allows the partition space to be explored more broadly. Importantly, mergers are performed only within each community of the unrefined partition. In addition, a node is merged with a community in the refined partition only if both are sufficiently well connected to their community in the unrefined partition. After the refinement phase is concluded, communities in the unrefined partition often will have been split into multiple communities in the refined partition, but not always.

The aggregate network is then created based on the refined partition. However, the initial partition for the aggregate network is based on the unrefined partition, as in the Louvain algorithm. By creating the aggregate network based on the refined partition rather than unrefined partition, the Leiden algorithm has room for identifying high-quality partitions. Moreover, because the refinement step from the Leiden algorithm is still used, the following guarantee can be made: Theorem 3—The communities obtained from the Leiden-Locale algorithm are connected.

At operation 310, it is determined whether to continue to iterate, or if the community detection is complete. In an example, the iteration may be performed a predefined number of times. If iteration is desired, control returns to operation 304. Otherwise, control passes to operation 312. Since only two rounds of updates of the Locale algorithm is performed in many examples, such an approach adds relatively little overhead and complexity to the Leiden algorithm. Yet, experiments show that the boost in accuracy is significant. The Leiden-Locale algorithm gives consistently better results than other methods.

At operation 312, the network is operated on in accordance with the community assignment. The community detection may be used to shed light on the structure of the network, which therefore provides insight to perform operations such as to monitor, model, sense, or actuate on the underlying system described by the network. For instance, the process 300 may be applied to identify model dependencies or interactions in physical, chemical, mechanical, economic, social, epidemiological, biological, neuronal, computational, and other types of systems. By identifying these communities, aspects of the network may be operated in accordance with the community assignment.

As some non-limiting examples of practical applications of the described community detection, the described approach may be used for operations such as market segmentation, criminal detection, or for recommendation systems. As one possibility, community detection may be used to identify communities in a social network, which may aid in identifying users that behave in a similar manner, for detecting groups of users with similar tastes or shopping habits, for advertisement, for tracking, for attribute learning, or for recommendations of new connections. As another possibility, the disclosed community detection methods may be used to detect bots or malicious users in a networks (e.g., due to their association with other undesirable users or other common characteristics of the malicious users), an activity that can bring much-needed transparency to the interactions that are becoming more common. Or, for a physical system such as a molecule, the community detection may be used to aid in identifying aspects of the atoms of the molecules for physical simulation.

In sum, this disclosure describes a Locale algorithm for community detection. The described approach generalizes the greedy local move procedure from the Louvain and Leiden methods by approximately solving a low-cardinality semidefinite relaxation. The described approach is scalable (orders of magnitude faster than other SDP solvers), empirically reaching the global optimum of the SDP on small datasets that can be verified with an SDP solver. Furthermore, this approach improves the local move update of the Louvain and Leiden methods and outperforms the state-of-the art community detection algorithms. By this improvement in performance and accuracy, the described approach improves the functioning of a computing device itself. The described approach therefore improves the use of a computing device in the technical field of community detection.

The Locale algorithm can also be interpreted as solving a generalized modularity problem (7) that allows assigning at most k communities to each node, and this may be intrinsically a better fit for practical use because in networks, as an entity being represented by a node usually belongs to more than one community. Further, the Locale algorithm hints a new way to solve heavily constrained SDPs when the solution is sparse but not low rank. It scales to millions of variables, which is well beyond previous approaches. From the algorithmic perspective, it also opens a new avenue for scaling-up semidefinite programming with the low-cardinality embeddings.

Figure 4:
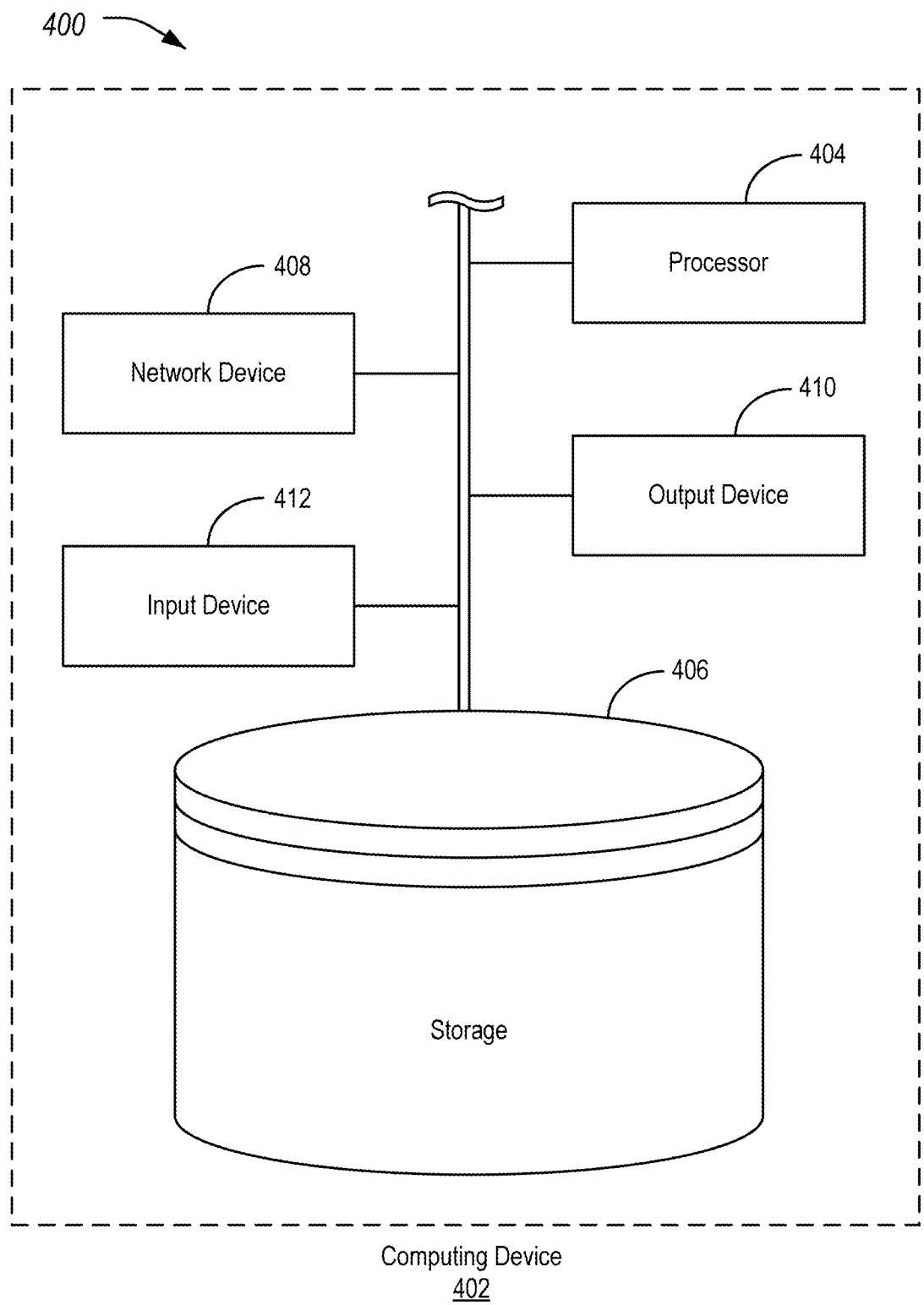
FIG. 4 illustrates an example of a computing device for performing the Locale method, in accordance with an embodiment of the disclosure as described herein with respect to FIGS. 1-3.

FIG. 4 illustrates an example 400 of a computing device 402 for use in performing community detection as described herein with respect to FIGS. 1-3. As shown, the computing device 402 may include a processor 404 that is operatively connected to a storage 406, a network device 408, an output device 410, and an input device 412. It should be noted that this is merely an example, and computing devices 402 with more, fewer, or different components may be used.

The processor 404 may include one or more integrated circuits that implement the functionality of a central processing unit (CPU) and/or graphics processing unit (GPU). In some examples, the processors 404 are a system on a chip (SoC) that integrates the functionality of the CPU and GPU. The SoC may optionally include other components such as, for example, the storage 406 and the network device 408 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation the processor 404 executes stored program instructions that are retrieved from the storage 406. The stored program instructions, accordingly, include software that controls the operation of the processors 404 to perform the operations described herein. The storage 406 may include both non-volatile memory and volatile memory devices. The non-volatile memory includes solid-state memories, such as NAND flash memory, magnetic and optical storage media, or any other suitable data storage device that retains data when the system is deactivated or loses electrical power. The volatile memory includes static and dynamic random-access memory (RAM) that stores program instructions and data during operation of the fingerprint authenticated start button 100.

The GPU may include hardware and software for display of at least two-dimensional (2D) and optionally three-dimensional (3D) graphics to the output device 410. The output device 410 may include a graphical or visual display device, such as an electronic display screen, projector, printer, or any other suitable device that reproduces a graphical display. As another example, the output device 410 may include an audio device, such as a loudspeaker or headphone. As yet a further example, the output device 410 may include a tactile device, such as a mechanically raiseable device that may, in an example, be configured to display braille or another physical output that may be touched to provide information to a user.

The input device 412 may include any of various devices that enable the computing device 402 to receive control input from users. Examples of suitable input devices that receive human interface inputs may include keyboards, mice, trackballs, touchscreens, voice input devices, graphics tablets, and the like.

The network devices 408 may each include any of various devices that enable the computing device 402 send and/or receive data from external devices over networks. Examples of suitable network devices 408 include an Ethernet interface, a Wi-Fi transceiver, a cellular transceiver, or a Bluetooth or BLE transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for performing community detection, comprising:
    receiving data descriptive of a network, the data including a set of nodes representing entities of a system and edges representing connections between the entities of the system;
    performing a modularity maximization to assign each node of the set of nodes to one or more communities to generate multiple-cardinality embeddings;
    rounding the multiple-cardinality embeddings to unit cardinality to recover a community assignment with maximum modularity;
    refining and aggregating the community assignment to create an aggregate network defining a set of connected communities of the network, the set of connected communities providing information about a community structure of the system; and
    operating on the network in accordance with the community assignment.

2. The method of claim 1, wherein the data descriptive of the set of nodes of the network describes of one or more of a physical, chemical, mechanical, economic, social, epidemiological, biological, neuronal, or computational system.

3. The method of claim 1, wherein the rounding includes assigning each note to a most likely community of the one or more communities.

4. The method of claim 1, wherein the modularity maximization includes using semidefinite programming (SDP) to generate the multiple-cardinality embeddings.

5. The method of claim 1, wherein the refining and aggregating operations include:
    assigning each node in each of a plurality of partitions of the network to its own community;
    locally merging the nodes in a refined partition such that nodes that are in their own in a community in the refined partition are merged with a different community at random, with the further constraint that mergers are performed only within each community of the partition before refining; and
    aggregating each of a plurality of partitions of the network to create the aggregate network.

6. The method of claim 1, wherein the modularity maximization, rounding, refining, and aggregating operations are performed a predefined plurality of times.

7. The method of claim 1, wherein the modularity maximization, rounding, refining, and aggregating operations are performed until no further communities are created.

8. A system for performing community detection, comprising:
    one or more computing devices, programmed to:
        receive data descriptive of a set of nodes of a network, the data including a set of nodes representing entities of a system and edges representing connections between the entities of the system;
        perform a modularity maximization to assign each node of the set of nodes to one or more communities to generate multiple-cardinality embeddings;
        round the multiple-cardinality embeddings to unit cardinality to recover a community assignment with maximum modularity;
        refine and aggregate the community assignment to create an aggregate network defining a set of connected communities of the network; and
        operate on the network in accordance with the community assignment.

9. The system of claim 8, wherein the data descriptive of the set of nodes of the network describes of one or more of a physical, chemical, mechanical, economic, social, epidemiological, biological, neuronal, or computational system, and the set of connected communities indicate a community structure of the system.

10. The system of claim 8, wherein the one or more computing devices are further programmed to round the multiple-cardinality embeddings by assigning each note to a most likely community of the one or more communities.

11. The system of claim 8, wherein the one or more computing devices are further programmed to utilize semidefinite programming (SDP) to generate the multiple-cardinality embeddings.

12. The system of claim 8, wherein the one or more computing devices are further programmed to:
    assign each node in each of a plurality of partitions of the network to its own community;
    locally merge the nodes in a refined partition such that nodes that are in their own in a community in the refined partition are merged with a different community at random, with the further constraint that mergers are performed only within each community of the partition before refining; and
    aggregate each of a plurality of partitions of the network to create the aggregate network.

13. The system of claim 8, wherein the one or more computing devices are further programmed to perform the modularity maximization, rounding, refining, and aggregating operations a predefined plurality of times.

14. The system of claim 8, wherein the one or more computing devices are further programmed to perform the modularity maximization, rounding, refining, and aggregating operations until no further communities are created.

15. A non-transitory computer-readable medium comprising instructions for performing community detection, that, when executed by one or more computing devices, cause the one or more computing devices to perform operations including to:
receive data descriptive of a set of nodes of a network, the data including a set of nodes represent entities of a system and edges representing connections between the entities of the system;
perform a modularity maximization to assign each node of the set of nodes to one or more communities to generate multiple-cardinality embeddings;
round the multiple-cardinality embeddings to unit cardinality to recover a community assignment with maximum modularity;
refine and aggregate the community assignment to create an aggregate network defining a set of connected communities of the network; and
operate on the network in accordance with the community assignment,
wherein the data descriptive of the set of nodes of the network describes of one or more of a physical, chemical, mechanical, economic, social, epidemiological, biological, neuronal, or computational system, and the set of connected communities indicate a community structure of the system.

16. The medium of claim 15, wherein the instructions further cause the one or more computing devices to perform operations including to round the multiple-cardinality embeddings by assigning each note to a most likely community of the one or more communities.

17. The medium of claim 15, wherein the instructions further cause the one or more computing devices to perform operations including to utilize semidefinite programming (SDP) to generate the multiple-cardinality embeddings.

18. The medium of claim 15, wherein the instructions further cause the one or more computing devices to perform operations including to:
assign each node in each of a plurality of partitions of the network to its own community;
locally merge the nodes in a refined partition such that nodes that are in their own in a community in the refined partition are merged with a different community at random, with the further constraint that mergers are performed only within each community of the partition before refining; and
aggregate each of a plurality of partitions of the network to create the aggregate network.

19. The medium of claim 15, wherein the instructions further cause the one or more computing devices to perform operations including to perform the modularity maximization, rounding, refining, and aggregating operations a predefined plurality of times.

20. The medium of claim 15, wherein the instructions further cause the one or more computing devices to perform operations including to perform the modularity maximization, rounding, refining, and aggregating operations until no further communities are created.

* * * * *